United States Patent [19]
Torikai et al.

[11] Patent Number: 5,966,925
[45] Date of Patent: Oct. 19, 1999

[54] GAS TURBINE POWER PLANT CONTROL FOR STARTING AND STOPPING

[75] Inventors: Takayuki Torikai; Takashi Fujisawa, both of Kawasaki; Kazutoshi Ishibashi, Yokohama, all of Japan

[73] Assignee: Kabushiki Kaisha Toshiba, Kawasaki, Japan

[21] Appl. No.: 08/840,657

[22] Filed: Apr. 25, 1997

[30] Foreign Application Priority Data

Apr. 26, 1996 [JP] Japan ................................. 8-107693

[51] Int. Cl.⁶ ............................................... F02C 7/26
[52] U.S. Cl. ................... 60/39.06; 60/39.141; 60/39.142
[58] Field of Search ............................... 60/39.06, 39.141, 60/39.142

[56] References Cited

U.S. PATENT DOCUMENTS

| | | | |
|---|---|---|---|
| 2,463,964 | 3/1949 | Graf | 60/39.142 |
| 4,341,071 | 7/1982 | Abo et al. | 60/39.141 |
| 4,378,673 | 4/1983 | Abo et al. | 60/39.141 |

*Primary Examiner*—Louis J. Casaregola
*Attorney, Agent, or Firm*—Foley & Lardner

[57] ABSTRACT

A method of controlling a gas turbine electric power plant comprises the steps of: prescribing the relationship between a time elapsed after a predetermined reference time (e.g., ignition time) in a predetermined process (e.g., the starting process) and a revolution speed of a turbine shaft in accordance with a first function (7); prescribing the relationship between a revolution speed of the turbine shaft and a flow rate of fuel to be supplied to a combustor (4) in accordance with a second function (10); measuring an actual revolution speed of the turbine shaft at the time elapsed; rotating the turbine shaft by a starting equipment (6) for driving the turbine shaft in such a way that the measured actual revolution speed becomes the revolution speed corresponding to the time elapsed prescribed in accordance with the first function; and obtaining a flow rate of fuel corresponding to the actual revolution speed in accordance with the second function, to supply the obtained fuel flow rate to the combustor (4).

15 Claims, 11 Drawing Sheets

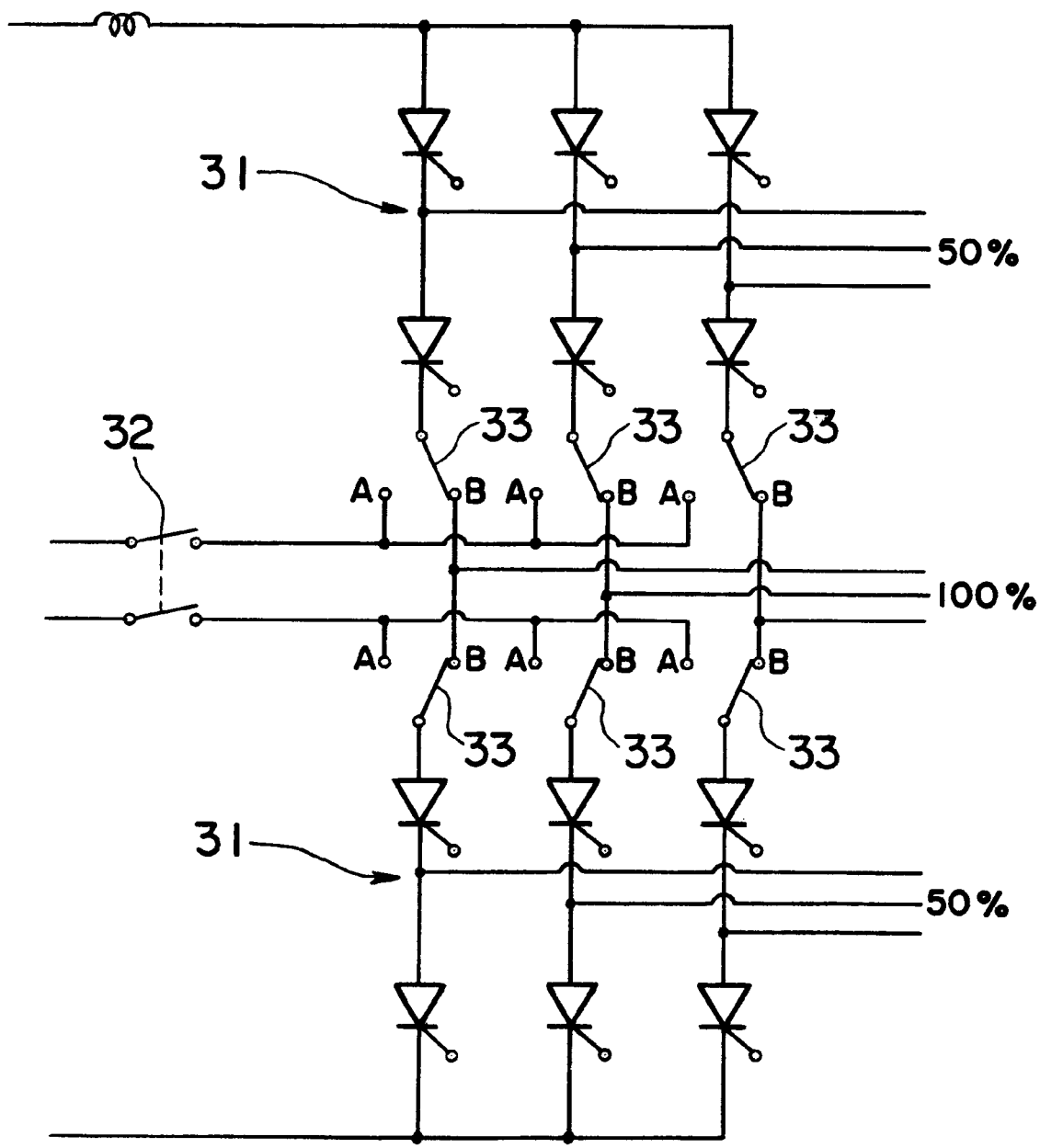
F I G. 11

GAS TURBINE POWER PLANT CONTROL FOR STARTING AND STOPPING

BACKGROUND OF THE INVENTION

1. Field of the Invention

The present invention relates to a gas turbine power plant control method and equipment, and more specifically to a method and equipment for controlling start and stop of an electric power plant provided with a gas turbine.

2. Description of the Prior Art

FIG. 12 is a schematic system diagram showing an electric power plant provided with a gas turbine, in which rotary bodies of a gas turbine 1, a compressor 2 and an electric power generator 3 are all fixed to a signal turbine shaft.

When the compressor 2 is rotated, air is introduced into a combustor 4, and then burnt together with fuel within the combustor 4, to generate a combustion gas. The generated combustion gas is supplied to the gas turbine 1, so that a power can be outputted from the turbine shaft. In this case, the flow rate of air supplied to the compressor 2 can be controlled by changing the opening rate of an inlet guide vane 5 disposed on the inlet side of the compressor 2.

In general, the construction such that the gas turbine 1, the compressor 2 and the electric power generator 3 are all coupled to a single gas turbine shaft is called a shaft structure. In the above-mentioned shaft structure, an auxiliary steam system and a starting equipment are provided in addition to the gas turbine 1, the compressor 2 and the electric power generator 3. Further, in general, a single power system is constructed by a plurality of shaft structures, and one electric power plant is constructed by arranging a plurality of the electric power systems. However, there exists such an example that an electric power plant is constructed by a single power system.

In the gas turbine electric power plant, in general the turbine shaft is rotated at a low speed as a preparatory operation, before the turbine shaft is started, which is referred to as turning operation. Here, the procedure from the low speed revolution to the rated speed revolution of the turbine shaft is as follows: in the case where a gas fuel is used as the fuel, in order to protect the power system from the unburnt fuel remaining on the downstream side of the gas turbine, purge operation for introducing air from the air compressor 2 to the gas turbine 1 is performed for 5 to 15 min by rotating the turbine shaft at a revolution speed of about 20 to 40% of the rated revolution speed. In the case where a liquid fuel is used, however, this purge operation can be omitted.

Further, until this purge operation ends, a necessary torque is kept generated to rotate the turbine shaft by use of a starting equipment.

In the state where this purge operation ends, since the revolution speed of the turbine shaft is higher than a predetermined revolution speed thereof required to ignite the gas turbine, the revolution speed of the turbine shaft is reduced from that for the purge operation to that for the gas turbine ignition, by controlling the revolution speed of the turbine shaft by use of the starting equipment. Further, after having been ignited, the gas turbine is warmed and then shifted to a speed-up control.

In this speed-up control, the revolution speed of the turbine shaft is increased in such a way that predetermined acceleration can be generated according to the revolution speed of the turbine shaft in accordance with a function. Further, a torque to be outputted according to the shaft revolution speed is set to the starting equipment. Therefore, an output torque of the starting equipment is subtracted from the acceleration torque required to generate the determined acceleration, and the amount of fuel to be supplied to the combustor 4 is controlled in such a way that this differential torque can be obtained by the gas turbine. In other words, the revolution speed of the turbine shaft is controlled indirectly.

As described above, in the prior art method, since the power required to drive the compressor exceeds the power generated by the gas turbine at the start of the turbine shaft, the starting equipment has been used as another driving source for starting the gas turbine.

Here, the acceleration of the gas turbine is so determined as to avoid an unstable operation of the compressor and further to prevent an excessive temperature rise of the combustion gas on the outlet side of the combustor. In particular, since the temperature of the combustion gas is determined below a level, the maximum capacity of the starting equipment is determined on the basis of the level of the combustion gas temperature.

As described above, after the gas turbine has been ignited, the revolution speed of the turbine shaft is increased up to near the rated revolution speed by the torque generated by the gas turbine and the torque supplied by the staring equipment. Here, when the revolution speed of the turbine shaft reaches roughly the rated revolution speed, the starting equipment is separated from the turbine shaft. Therefore, after that, the operation of the turbine shaft is controlled by the control equipment of the gas turbine. Further, after the revolution speed of the shaft has reached the rated revolution speed and thereby the electric power generator 3 has been connected to an external power system, the gas turbine electric power plant is shifted to the ordinary operation.

On the other hand, in stop process, the operation of the gas turbine electric power plant is controlled as follows: After the fuel has been reduced rapidly from the base load operation (the maximum load operation of the gas turbine) to the no-load operation, the electric power generator is disconnected from an external power system. After the electric power generator has been disconnected from the external power system, the revolution speed of the gas turbine is not dependent upon the frequency of the external power system. In contrast with this, when the electric power generator is connected to the external power system in the ordinary operation, the revolution speed of the gas turbine is the same as the frequency of the external power system. For instance, in the region of 50Hz, since the revolution speed of the gas turbine is 3000rpm, that is, 50rps. That is, once the electric power generator has been disconnected from the external power system, since the revolution speed of the gas turbine is not dependent upon the frequency of the external power system, it is necessary to control the gas turbine in such a way that the revolution speed thereof will not exceed the rated revolution speed. That is, it is necessary to reduce the revolution speed of the gas turbine by sufficiently reduce the flow rate of the fuel to be supplied to the gas turbine. Here, in the case of the gas turbine of 150MW to 250 MW power class, a time required from the disconnection to the stop is about 5 to 10 min.

In this stop process, temperature drops rapidly at the high temperature sections of the gas turbine (e.g., a combustion chamber, transition pieces, first-stage static vanes, moving vanes, etc.). For instance, in the case of the gas turbine of 1300° C. class, although the inlet side temperature of the first-stage moving vanes is 1300° C. in the base load operation, the same temperature of the first-stage moving vanes drops down to about 700° C. to 900° C. in the no-load operation. Further, in the stop process, since the inlet side temperature of the first-stage moving vanes drops down to about 20° C. to 50° C. (roughly equal to the room temperature). As described above, the high temperature parts of the gas turbine are subjected to an excessive thermal stress, so that the life time of these high temperature parts of the gas turbine is reduced markedly.

In particular, the high temperature parts of the gas turbine are usually casted precisely by use of an Ni or Co-based supper alloy in such a way as to form a complicated air cooling structure in the casted parts. Therefore, in the high temperature parts of complicated structure, stress is easily concentrated at various positions thereof. In addition, since these parts are of cast products, the material of the high temperature parts is very weak against the strain caused by thermal stress. Accordingly, in the actual gas turbine now being operated, there exist a problem in that a great number of cracks are easily generated in the high temperature parts with increasing operation time and with increasing number of start and stop times, with the result that it is necessary to repair the high temperature parts periodically by welding, for instance.

In particular, during the operation course from the start to the rated load operation, the strains caused by thermal stress increase in the high temperature parts. For instance, in the case of nozzle, since the nozzle temperature rises from the low temperature at the stop to the maximum temperature in the rated load operation, the material for constructing the nozzle expands. As a result, since the nozzle is fixed to the casing, a compressive strain (a strain caused in the compression direction) is generated. On the other hand, during the operation course from the rated operation to the stop operation, since the nozzle fixed to the casing is cooled rapidly, a tensile strain (a strain caused in the tension direction) is generated.

As described above, since a difference between the compressive strain and the tensile strain causes a one-cycle thermal stress change from the start operation to stop operation, so that a fatigue based upon the thermal stress (referred to as low-cycle fatigue) is repeated. In this case, the compressive strain is subjected to the rated operation at the maximum gas temperature and the tensile strain is subjected to the stop operation at the room temperature, both being subjected to the time change of the gas turbine operation.

At present, a greater number of the domestic gas turbine electric power plants are operated as an intermediate load power source of "daily start and stop"(the daily operation and the night operation are repeated every day). Therefore, since the life time of the high temperature parts of the gas turbine is reduced in the operation change from the start to the stop, the maintenance cost is huge. This is because the rare metal material of Ni- or Co-based supper alloy having a temperature resistance as high as 700° C. to 900° C. must be used as the material for the high temperature parts, and in addition the expensive high temperature parts of precise cast products formed with a number of cavities for air cooling must be repaired by welding or exchanged whenever the gas turbine maintenance is made for each year or ever second year.

In summary, in the prior art gas turbine electric power plant, during the operation course from the gas turbine start to the gas turbine stop, since the temperature change range and the temperature change rate are both large in the outlet gas temperature of the combustor, there exists a problem in that the life time of these high temperature parts for constituting the gas turbine is short.

In addition, in the prior art gas turbine electric power plant, an effort to reduce the temperature change rate within the gas turbine in the stop operation has been so far made by delaying the deignition timing as long as possible, after the disconnection of the electric power generator from the external power system. In this case, however, when the revolution speed of the turbine shaft is dropped after the disconnection, since the efficiency of the compressor drops abruptly and thereby the gas temperature drops at the same time, the fuel supplied to the gas turbine is also reduced, so that the turbine output also drops. As a result, the revolution speed of the gas turbine drops abruptly; the air flow rate also decreases; and thereby the fuel to be supplied decreases. Therefore, when the gas temperature is tried to be reduced gradually, there exists inevitably a limit due to the basic and inherent characteristics of the gas turbine.

SUMMARY OF THE INVENTION

With these problems in mind, therefore, it is the object of the present invention to provide a control method and a control equipment for the gas turbine electric power plant suitably applied to a thermal electric power plant, which can reduce the temperature change width and temperature change rate with respect to time caused by the change of acceleration control of the turbine shaft during the operation course from the start to stop at the high temperature parts of the gas turbine, which can improve the reliability and increase the life time of the high temperature parts of the gas turbine, and which can improve the reliability and reduce the maintenance cost of the turbine shaft constituting equipments.

To achieve the above-mentioned objects, the present invention provides a method of controlling a gas turbine electric power plant, comprising the steps of: prescribing relationship between a time elapsed after a predetermined reference time in a predetermined process for controlling a gas turbine electric power plan and a revolution speed of a turbine shaft in accordance with a first function; prescribing relationship between a revolution speed of the turbine shaft in the predetermined process and a flow rate of fuel to be supplied to a combustor in accordance with a second function; measuring an actual revolution speed of the turbine shaft at the time elapsed; rotating the turbine shaft by a starting equipment for driving the turbine shaft in such a way that the measured actual revolution speed becomes the revolution speed corresponding to the time elapsed prescribed in accordance with the first function; and obtaining a flow rate of fuel corresponding to the actual revolution speed in accordance with the second function, to supply the obtained fuel flow rate to the combustor.

Here, it is characterized that the starting equipment is a static type starting equipment for using an electric power generator directly connected to the gas turbine, as a motor.

Further, it is characterized that the starting equipment is a driving motor.

Further, it is characterized that the predetermined process is such a starting process that the revolution speed of the turbine shaft reaches a rated revolution speed after the gas turbine has been ignited.

Further, it is characterized that the predetermined reference time is an ignition time of the gas turbine.

Further, it is characterized that the predetermined process is a disconnection and stop process of the turbine shaft, executed after an electric power generator has been disconnected from an external power system in stop operation of the gas turbine.

Further, it is characterized that the predetermined reference time is a disconnection time of the electric power generator from the external power system.

Further, it is characterized that the second function prescribes relationship between the revolution speed of the turbine shaft and the flow rate of fuel supplied to the combustor in such a way that a change width or a change rate with respect to time of gas turbine inlet temperature lies within an allowable range; and the first function prescribes the relationship between the time elapsed and the revolution speed of the turbine shaft in such a way that the change width or the change rate with respect to time of the gas turbine inlet temperature lies within the allowable range, by supplying an amount of air required to burn fuel of the obtained flow rate to be supplied to the combustor.

Further, it is characterized that the starting equipment drives the turbine shaft in such a way that a difference between the measured actual revolution speed and the revolution speed of the turbine shaft corresponding to the time elapsed prescribed in accordance with the first function is zeroed.

In the control method according to the present invention, the predetermined process for controlling the gas turbine electric power plant can be applied to various process from the starting process to the disconnection and stop process. The first and second functions are so determined as to be applied to such control process as the starting process or the disconnection and stop process. The starting equipment rotates the turbine shaft in such a way that the relationship between the time elapsed after the predetermined reference time and the revolution speed of the turbine shaft can follow the first function. The amount of air to be supplied to the combustor via the compressor coupled to the turbine shaft can be controlled in such a way as to be enough to burn the fuel of the flow rate supplied to the combustor. The fuel of the flow rate obtained in accordance with the second function on the basis of the revolution speed of the turbine shaft controlled by the starting equipment is supplied to the combustor.

Further, in the control method according to the present invention, since the revolution speed of the turbine shaft can be controlled by the starting equipment, it is possible to control the revolution speed of the turbine shaft at a high response speed, without deteriorating the response speed as with the prior art case where the revolution speed thereof is controlled on the basis of only the flow rate of fuel supplied to the combustor. As the starting equipment, it is possible to use a static starting equipment for using the electric power generator coupled to the gas turbine shaft as a motor, or a driving motor.

As a result, in both the starting process and the disconnection and stop process, since the change width or the change rate with respect to time of the inlet side temperature of the gas turbine can be controlled so as to lie within an allowable range, it is possible to reduce the change width and the change rate of the temperature of the high temperature parts of the gas turbine, with the result that the life time of the high temperature parts of the gas turbine can be increased.

Further, the present invention provides a method of controlling a gas turbine electric power plant, comprising the steps of: prescribing relationship between a time elapsed after a predetermined reference time in a disconnection and stop process of a turbine shaft, after an electric power generator has been disconnected from an external power system in a stop operation of a gas turbine, and a revolution speed of the turbine shaft in accordance with a first function; prescribing relationship between the revolution speed of the turbine shaft in the disconnection and stop process and a flow rate of fuel to be supplied to a combustor in accordance with a second function; measuring an actual revolution speed of the turbine shaft at the time elapsed; controlling the flow rate of fuel to be supplied to the combustor in such a way that the measured actual revolution speed of the turbine shaft becomes the revolution speed at the time elapsed obtained in accordance with the first and second functions; prescribing relationship between the revolution speed of the turbine shaft and a generated starting torque in accordance with a third function; obtaining the torque to be generated corresponding to the actual revolution speed in accordance with the third function; and driving the turbine shaft in such a way that the obtained torque can be generated by a starting equipment for driving the turbine shaft.

In the control method according to the present invention, the revolution speed of the turbine shaft is controlled by mainly controlling the flow rate of fuel supplied to the combustor in accordance with the first and second functions. The stating equipment drives the turbine in such a way that a torque corresponding to the obtained actual revolution speed of the turbine shaft can be generated in accordance with the third function. As a result, in the disconnection and stop process of the turbine shaft after the electric power generator has been disconnected from an external power system, it is possible to prevent the revolution speed control of the turbine shaft from being out of control. Therefore, since the change width or the change rate with respect to time of the inlet side temperature of the gas turbine can be controlled so as to lie within an allowable range, it is possible to reduce the change width and the change rate of the temperature of the high temperature parts of the gas turbine, with the result that the life time of the high temperature parts of the gas turbine can be increased.

Further, the present invention provides a method of controlling a gas turbine electric power plant, which comprises the steps of: when an output of a turbine shaft drops abruptly as when a load is cut off, detecting a decrease of the turbine shaft output; operating a static type starting equipment for using an electric power generator as a motor in such a way as to be actuated as a resistance body of the turbine shaft, to suppress a rise in revolution speed of a gas turbine.

In the control method according to the present invention, since the static starting equipment is used as the starting equipment, even when the output of the turbine shaft drops abruptly as when the load is cut off, it is possible to control the revolution speed of the turbine shaft.

Further, the present invention provides a control equipment for controlling a gas turbine electric power plant, in which a gas turbine, an electric power generator and a compressor are coupled to each other via a single shaft, which comprises: a data section for prescribing relationship between a time elapsed after a predetermined reference time in a predetermined process for controlling a gas turbine electric power plan and a revolution speed of a turbine shaft in accordance with a first function and for further prescribing relationship between a revolution speed of the turbine shaft in the predetermined process and a flow rate of fuel to be supplied to a combustor in accordance with a second function; revolution speed measuring means for measuring an actual revolution speed of the turbine shaft at the time elapsed; a starting equipment for driving the turbine shaft in such a way that the revolution speed of the turbine shaft becomes a revolution speed corresponding to the time elapsed prescribed in accordance with the first function; and fuel control means for obtaining a fuel flow rate corresponding to the actual revolution speed of the turbine shaft in accordance with the second function, to supply fuel of the obtained flow rate to the combustor.

Here, it is characterized that the starting equipment is a static type starting equipment for using an electric power generator directly connected to the gas turbine, as a motor.

Further, it is characterized that the static type starting equipment controls the revolution speed of the turbine shaft, by supplying variable frequency current to the electric power generator so as to generate a torque as a motor.

Further, it is characterized that the starting equipment is a driving motor.

Further, it is characterized that the gas turbine electric power plant is constructed by a plurality of turbine shafts each obtained by coupling a gas turbine, an electric power generator and a compressor via a single shaft; a static type starting equipment of the same capacity used as the electric power generator directly connected to the gas turbine is provided for each shaft of the plural turbine shafts; and at least two static type starting equipments of the same capacity and provided for each shaft can be connected to a single shaft in combination.

Further, it is characterized that the gas turbine electric power plant is constructed by a plurality of turbine shafts each obtained by coupling a gas turbine, an electric power generator and a compressor via a single shaft; a static type starting equipment of the same capacity used as the electric power generator directly connected to the gas turbine is provided for each shaft of the plural turbine shafts; and at least two static type starting equipments of the same capacity and provided for each shaft are connected in cascade via disconnecting switches.

BRIEF DESCRIPTION OF THE DRAWINGS

FIG. 11 is a three-wire connection diagram showing the cascade connection circuit of the static type starting equipment shown in FIG. 10.

DETAILED DESCRIPTION OF THE EMBODIMENTS

Embodiments of the present invention will be described hereinbelow with reference to the attached drawings.

Figure 1:
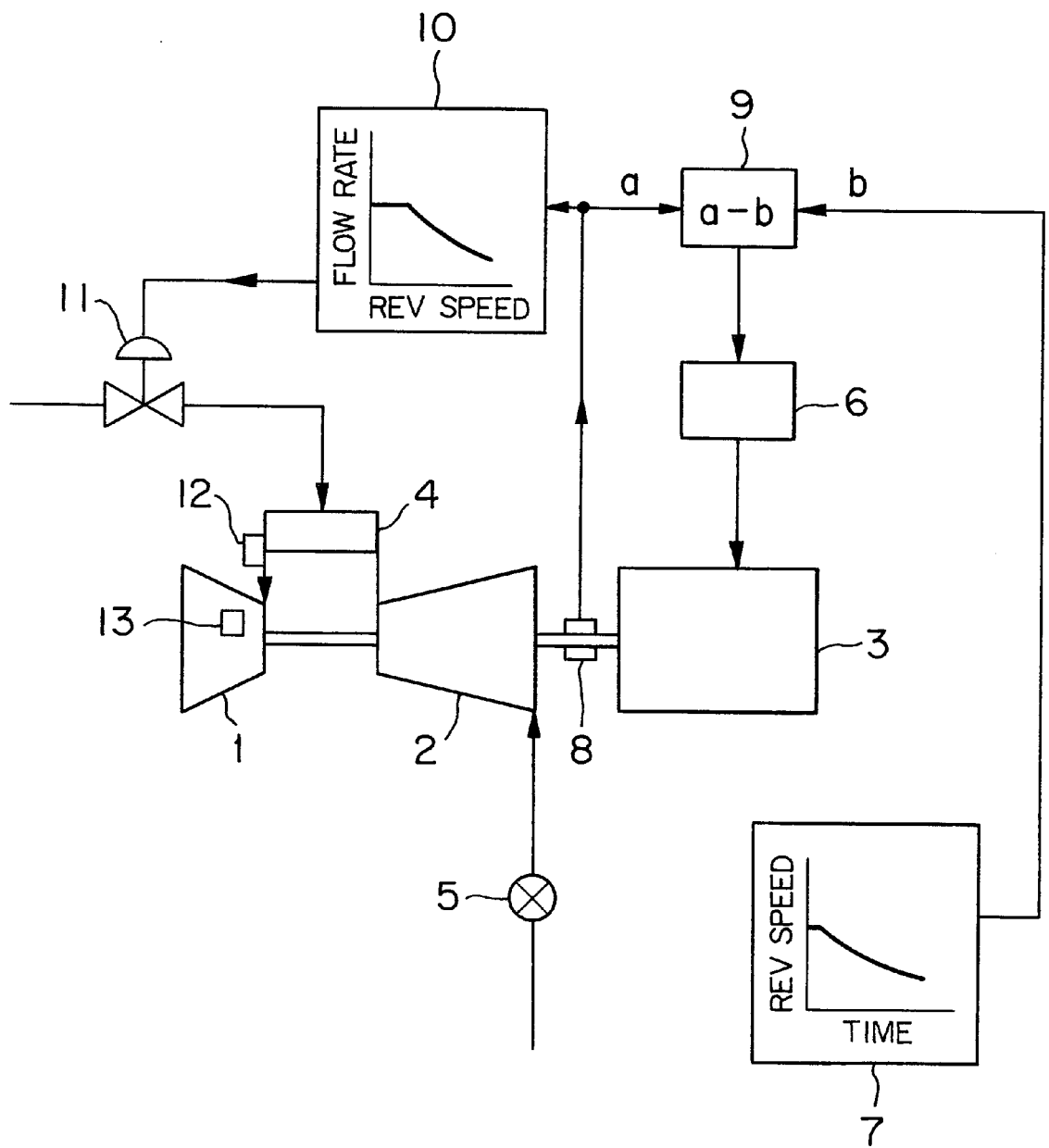
FIG. 1 is a schematic system diagram showing a first embodiment of the gas turbine electric power plant according to the present invention.

FIG. 1 is a schematic system diagram showing a first embodiment of a control equipment of the gas turbine electric power plant according to the present invention, in which only a single turbine shaft of the electric power plant composed of a plurality of turbine shafts is shown. The single turbine shaft is composed of a gas turbine 1, a compressor 2, and an electric power generator 3 all fixed to each other via the single turbine shaft. The flow rate of fuel supplied to the combustor 4 is controlled by a fuel control valve 11 disposed in fuel control means. The combustion air burnt together with the fuel by the combustor 4 is sucked by the compressor 2 through an inlet guide vane 5 and then supplied into the combustor 4.

Electric power can be generated when the electric power generator 3 is driven by a driving force of the gas turbine 1. Further, the generated electric power is supplied from the electric power generator 3 to an external power system (not shown).

The outlet temperature of the combustor 4 can be detected by a combustor outlet temperature detector 12 disposed at the outlet portion of the combustor 4. Further, the gas turbine inlet temperature can be detected by a gas turbine inlet temperature detector 13 disposed at the inlet portion of the gas turbine 1.

In addition to the above-mentioned elements, in the present invention, a starting equipment for driving the turbine shaft is provided. The starting equipment operates in such a way as to avoid an abrupt change of the revolution speed of the gas turbine in the starting process from when the gas turbine is ignited to when the revolution speed of the gas turbine reaches a rated revolution speed and in the disconnection and stop process from when the electric power generator 3 is disconnected from the external power system to when the gas turbine is stopped. As the starting equipment, a static type starting equipment 6 is used, which can give a variable frequency current to the electric power generator 3 in such a way that the electric power generator 3 can generate a torque as a motor.

Figure 7:
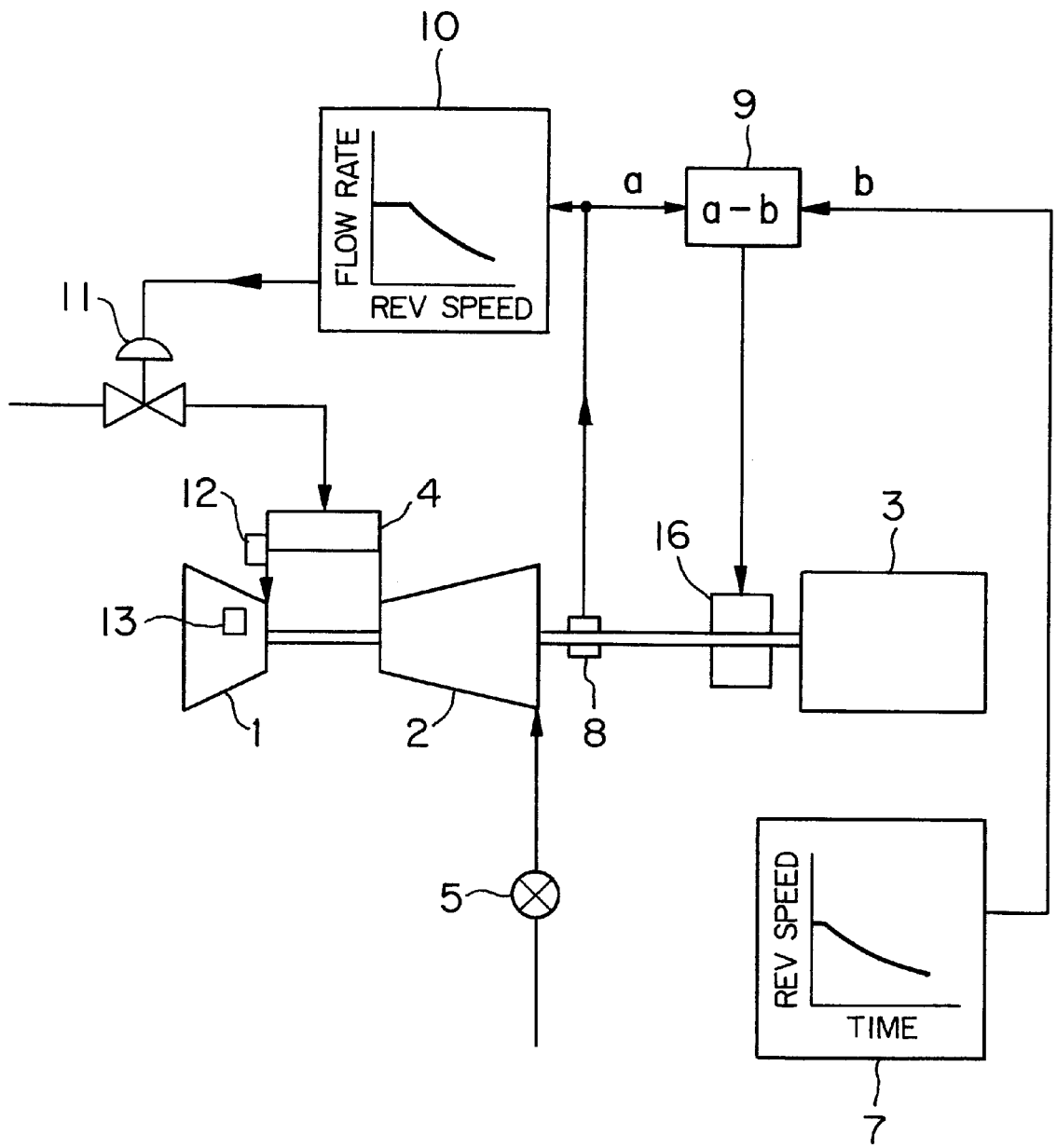
FIG. 7 is a schematic system diagram showing a modification of the first embodiment of the gas turbine electric power plant according to the present invention, in which a driving motor is used as the starting equipment.

Further, as the starting equipment, without being limited only to the static type starting equipment 6 for activating the electric power generator 3 as a motor, it is also possible to use a driving equipment such as a motor 16 coupled to the turbine shaft as shown in FIG. 7. In the following description, however, an example in which the static type starting equipment 6 for activating the electric power generator 3 as a motor will be explained hereinbelow.

As shown in FIG. 1, a first function 7 and a second function 10 are provided in a data section. The first function 7 prescribes the relationship between the time elapsed after a predetermined reference time in a predetermined process for controlling the gas turbine electric power plant and the revolution speed of the gas turbine. Further, the second function 10 prescribes the relationship between the revolution speed of the turbine shaft in a predetermined process and the flow rate of the fuel supplied to the combustor 4 via the compressor 2.

Here, the data (a) indicative of the actual revolution speed of the turbine shaft measured by a speed detector 8 and the data (b) indicative of the revolution speed obtained at each time elapsed in accordance with the first function 7 (set to the function setting device) are both inputted to a comparator 9, to calculate a difference (a–b) between the two data. The output of the comparator 9 is inputted to the static type starting equipment 6. The static type starting equipment activates the electric power generator 3 as a motor in such a way that the calculated difference (a–b) can be zeroed.

Further, the fuel control means controls the fuel control valve 11 in such a way that the fuel flow rate suitable to the obtained actual revolution speed can be supplied to the combustor 4 in accordance with both the actual revolution speed data measured by the speed detector 8 and the second function 10 (set in the function setting device).

Here, the combustion air flow rate to be supplied to the combustor 4 via the compressor 2 depends upon the revolution speed of the compressor 2. Therefore, the revolution speed of the gas turbine is controlled by the static type starting equipment 6 in such a way that the combustion air flow rate is enough to burn the fuel of the flow rate controlled by the fuel control valve 11.

A more practical embodiment of the present invention will be explained hereinbelow.

The initial portion of the starting process of the turbine shaft of the thermal electric power plant is the same as with the case of the prior art. In more detail, first, in order to protect the power system from the non-burnt fuel remaining on the downstream side of the gas turbine, the purge operation is made for 5 to 15min by rotating the turbine shaft at a revolution speed of about 20 to 40% of the rated revolution speed, to pass air discharged from the air compressor of the gas turbine.

Figure 2:
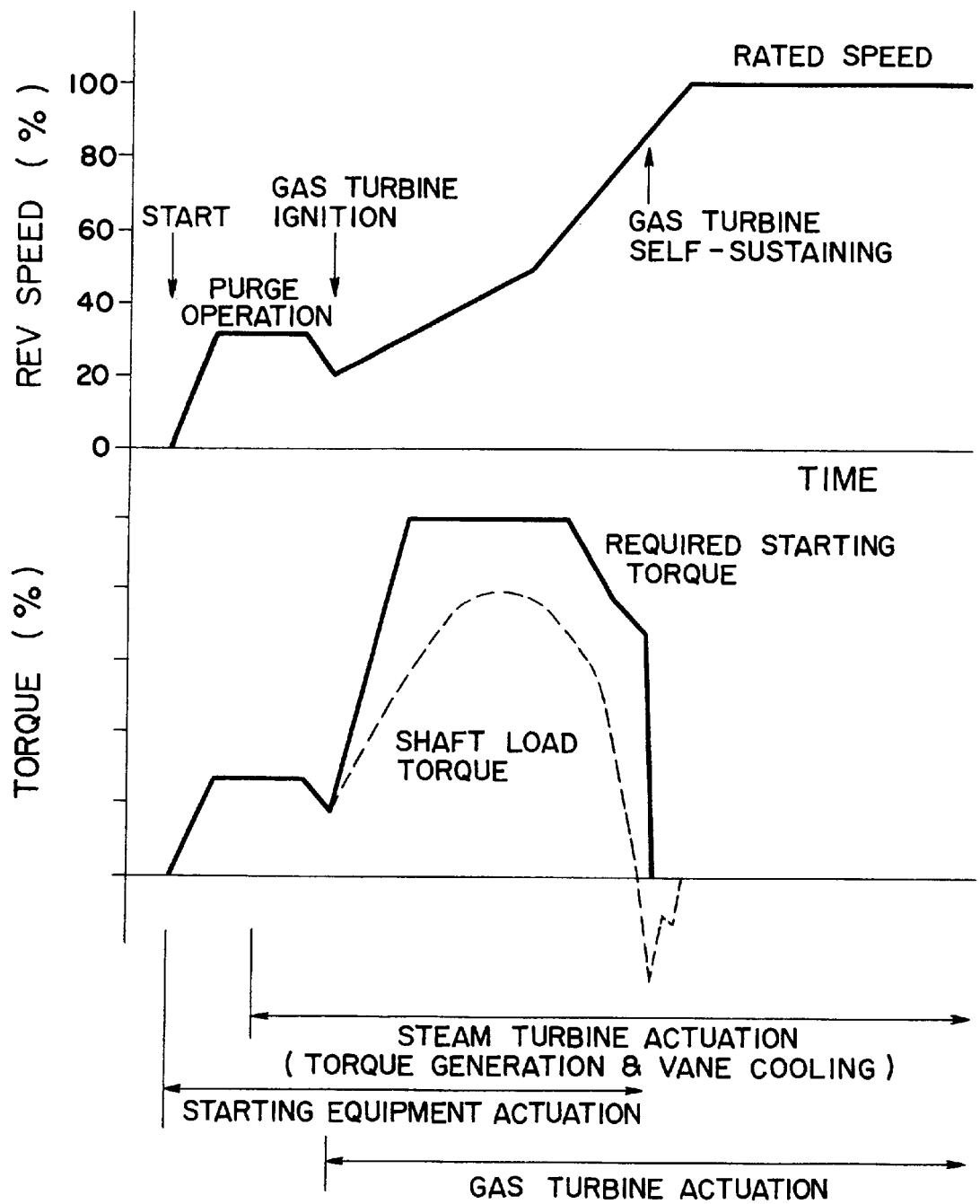
FIG. 2 is a graphical representation showing the change of the revolution speed of the turbine shaft with respect to time, the shaft load torque, and the output torque required for starting the turbine shaft in the start process.

FIG. 2 shows the relationship between the time elapsed in the starting process of the turbine shaft and the revolution speed of the gas turbine, the relationship between the same time elapsed in the starting process and the shaft load torque and the output torque required to start the turbine shaft, and the operating ranges of the power generating source. Here, the shaft load torque is a torque consumed to drive the compressor 2 as a load. A part of the output torque required to start the turbine shaft is used as the shaft load torque, and the remaining torque is used to accelerate the turbine shaft. In other words, the accelerating torque required from the ignition of the gas turbine to the rated revolution speed is a difference between the output torque required to start the turbine shaft and the shaft load torque. Further, in FIG. 2, although the torque allotted to each element is not shown clearly, the torque supplied by a steam turbine is of auxiliary, and further the output torque required for starting is supplied mainly by the static type starting equipment 6 and the gas turbine 1.

In practice, until the purge operation is completed, current is supplied from the static type starting equipment 6 to the electric power generator 3 in such a way that the generator 3 can be operated as a motor, in order to generate the output torque required for starting.

After the completion of the purge operation, the shaft revolution speed is reduced down to a revolution speed at which the gas turbine can be ignited, by adjustably reducing the torque supplied via the static type starting equipment 6 and the generator 3 operating as a motor, and then fuel is supplied to the combustor 4 for ignition.

After ignition, although the gas turbine 1 begins to generate a torque, since the torque consumed by the compressor 2 is relatively large, the torque required to accelerate the turbine shaft is mainly obtained by the static type starting equipment 6.

On the other hand, the fuel supplied to the ignited gas turbine 1 is increased in accordance with the fuel supply plan determined on the basis of the predetermined first and second functions 7 and 10 in such a way that high thermal stress will not be generated at the high temperature parts of the gas turbine, due to the outlet gas temperature and its increase rate of the combustor decided according to the air flow rate determined by the shaft revolution speed and the opening rate of the inlet guide vane 5. In this case, however, it should be noted that the fuel determined by this fuel supply plan does not include the fuel required for accelerating the turbine shaft. That is, the revolution speed of the turbine shaft is controlled by the starting equipment 6 in this starting operation.

Figure 3:
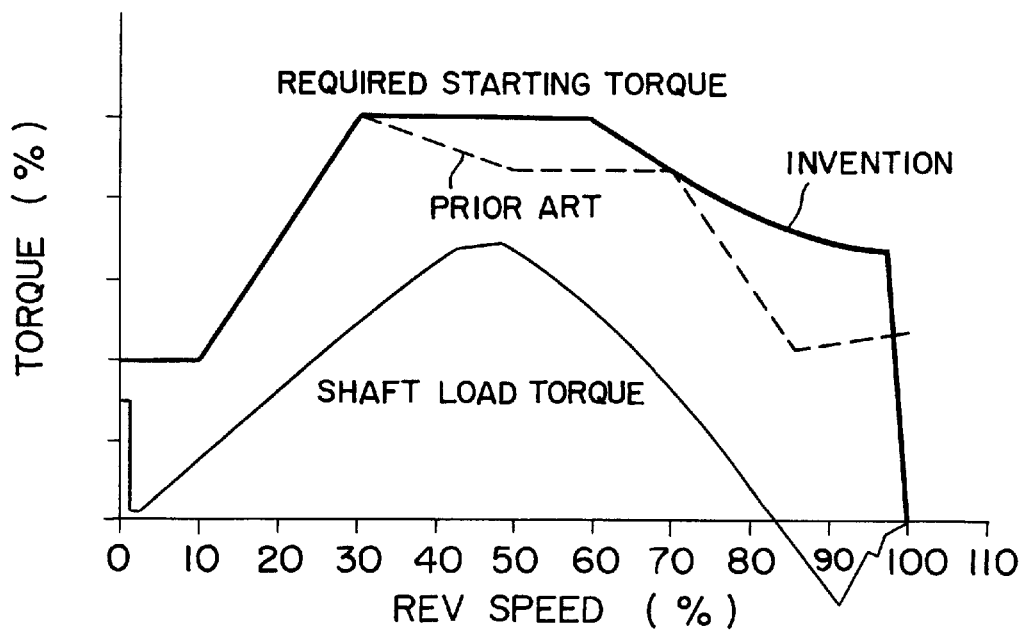
FIG. 3 is a graphical representation showing the relationship between the shaft load torque and the revolution speed of the turbine shaft in the starting process and the relationship between the output torque required for starting and the revolution speed of the turbine shaft, in which two solid lines indicate those of the invention and a dashed line indicates that of the prior art.

Therefore, the output torque required for starting the turbine shaft becomes as shown by a solid line in FIG. 3. Further, in FIG. 3, a dashed line shows the output torque required for starting the turbine shaft in the prior art method.

Figure 4:
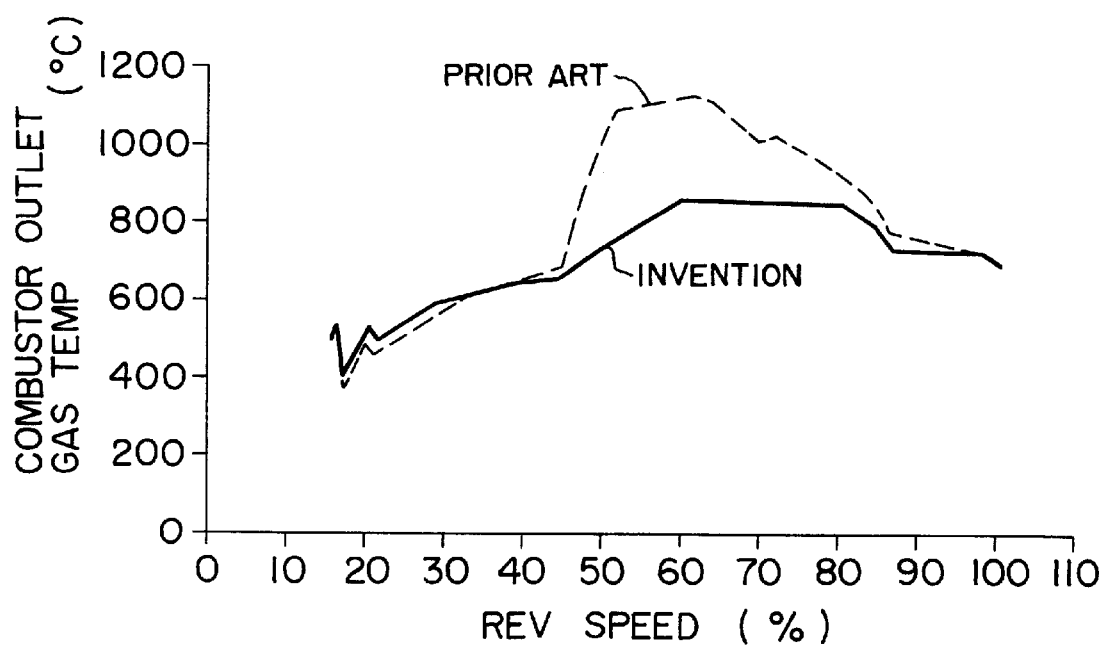
FIG. 4 is a graphical representation showing the relationship between the outlet gas temperature of the combustor and the revolution speed of the turbine shaft in the starting process, in which a solid line indicates that of the invention and a dashed line indicates that of the prior art.

As described above, in the control method of the present invention, since the acceleration of the shaft is not controlled by controlling the amount of fuel supplied, the change of the outlet gas temperature of the combustor lies between 400° C. to 800° C. as shown by a solid line in FIG. 4, which is more smooth when compared with the prior art temperature change. Further, in FIG. 4, the change of the outlet gas temperature of the combustor obtained by the prior art method is shown by a dashed line in FIG. 4.

In general, the time required from when the gas turbine is ignited to when the gas turbine reaches the rated revolution speed is about 15 to 20 min. Therefore, if the temperature change range and change rate of the high temperature parts of the gas turbine can be both reduced with respect to time in this period of the starting operation, since the thermal stress can be reduced markedly, it is possible to lengthen the life time of the high temperature parts of the gas turbine.

In addition, since the revolution speed of the gas turbine can be changed in the starting operation by controlling the output of the static type starting equipment 6 (instead of controlling the fuel supply rate of the gas turbine), it is possible to simplify the construction of the gas turbine control system, by controlling only the load and the revolution speed (e.g., 50 Hz) of the gas turbine. On the other hand, since the static type starting equipment 6 is controlled in accordance with a set value received by the control system of the gas turbine, the control system is not so complicated even if the control method is modified in this way.

When the static type starting equipment is adopted as the starting equipment as described above, various modifications can be considered on the basis of the constructions of the starting equipment and the power system and in combination between the number of the turbine shafts and the capacity of the starting equipment, in the thermal electric power plant having a plurality of gas turbine shafts, without being limited to only the above description.

The stop process of the gas turbine shaft will be described hereinbelow.

In the shaft stop process, the revolution speed of the gas turbine is reduced down to that corresponding to the no-load operation by adjusting the fuel amount supplied to the gas turbine via the fuel adjusting valve 11 disposed in the fuel system (not shown). Under these conditions, when the electric power generator 3 is disconnected from an external power system, the gas turbine reaches the no-load rated revolution operation, in the same way as with the case of the prior art method.

In the prior art, the amount of fuel supplied to the gas turbine is reduced in accordance with a function of the revolution speed of the gas turbine; that is, the revolution speed of the turbine shaft is reduced naturally according to the reduction of the amount of the fuel supply. Further, in general, the following method has been so far adopted: the gas turbine is deignited after having confirmed that a predetermined time has elapsed after the disconnection of the electric power generator or that the gas turbine has reached a predetermined revolution speed or that the gas turbine is deignited naturally. After that, the revolution speeds of the other shafts are reduced naturally down to the turning status.

In the same way as with the case of the starting process, even in the stop process, it is possible to suppress the thermal stress generation by reducing the change width and the change rate of the outlet gas temperature of the combustor. Further, in order to suppress the thermal stress generation during the deignition of the gas turbine, it is necessary to obtain such conditions that the revolution speed of the turbine shaft is small and further the outlet gas temperature of the combustor is low. The reason is as follows: since the outlet gas temperature of the combustor is reduced down to the outlet temperature of the air compressor the moment the gas temperature is deignited, when the temperature immediately before deignition is high and further when the revolution speed of the shaft is high, the surface of the high temperature parts (metal) is cooled rapidly, with the result that a large thermal stress is generated.

Figure 5:
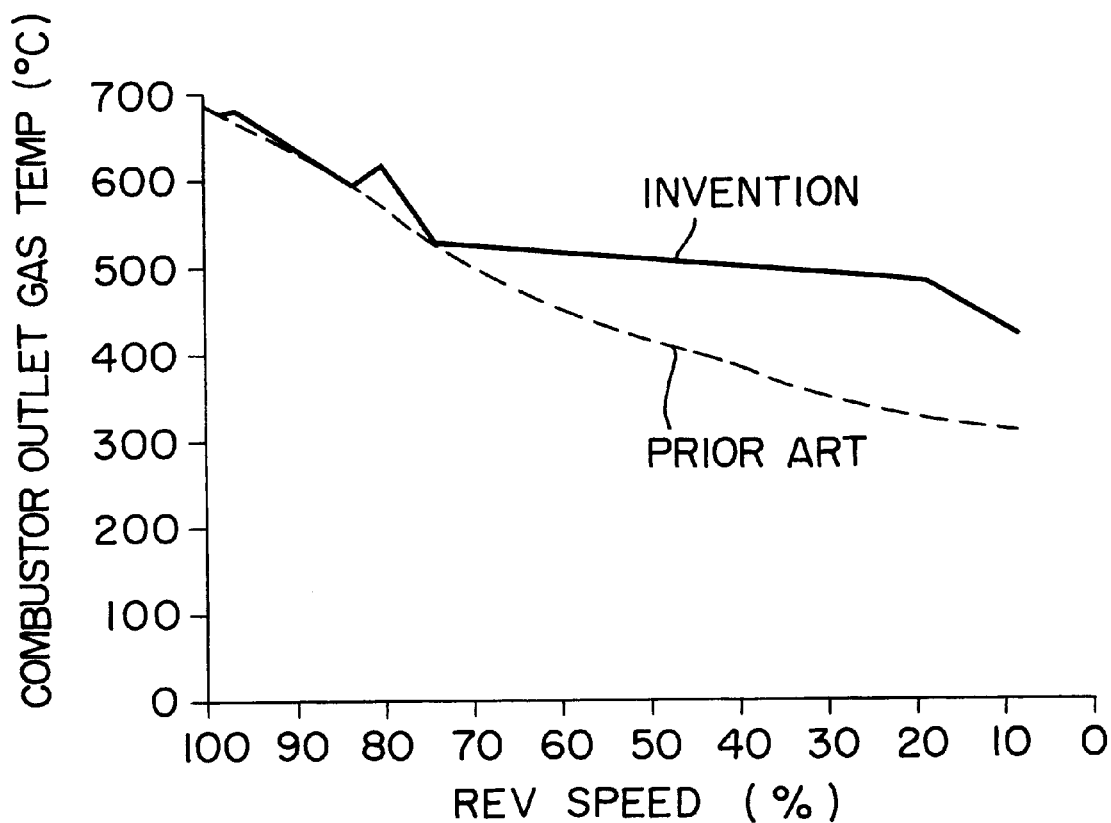
FIG. 5 is a graphical representation showing the relationship between the outlet gas temperature of the combustor and the revolution speed of the turbine shaft in the stopping process, in which a solid line indicates that of the invention and a dashed line indicates that of the prior art.

As shown by a dashed line in FIG. 5, in the prior art method, the surface of the high temperature parts (metal) is cooled rapidly. In contrast with this, in the control method according to the present invention, the surface of the high temperature parts (metal) can be cooled relatively gradually as shown by a solid line in FIG. 5.

In the present invention, the minimum fuel is supplied to the combustor 4 according to the revolution speed of the turbine shaft to such an extent that the gas turbine is not deignited, and further a drop of the revolution speed of the turbine shaft is controlled by the static type starting equipment 6. Therefore, it is possible to suppress the thermal stress generation by setting the change rate of the outlet gas temperature of the combustor below a predetermined value as shown by the solid line in FIG. 5. Further, since the change width of the outlet gas temperature of the combustor can be suppressed at the same time in the stop operation, the thermal stress generation can be suppressed.

Figure 6:
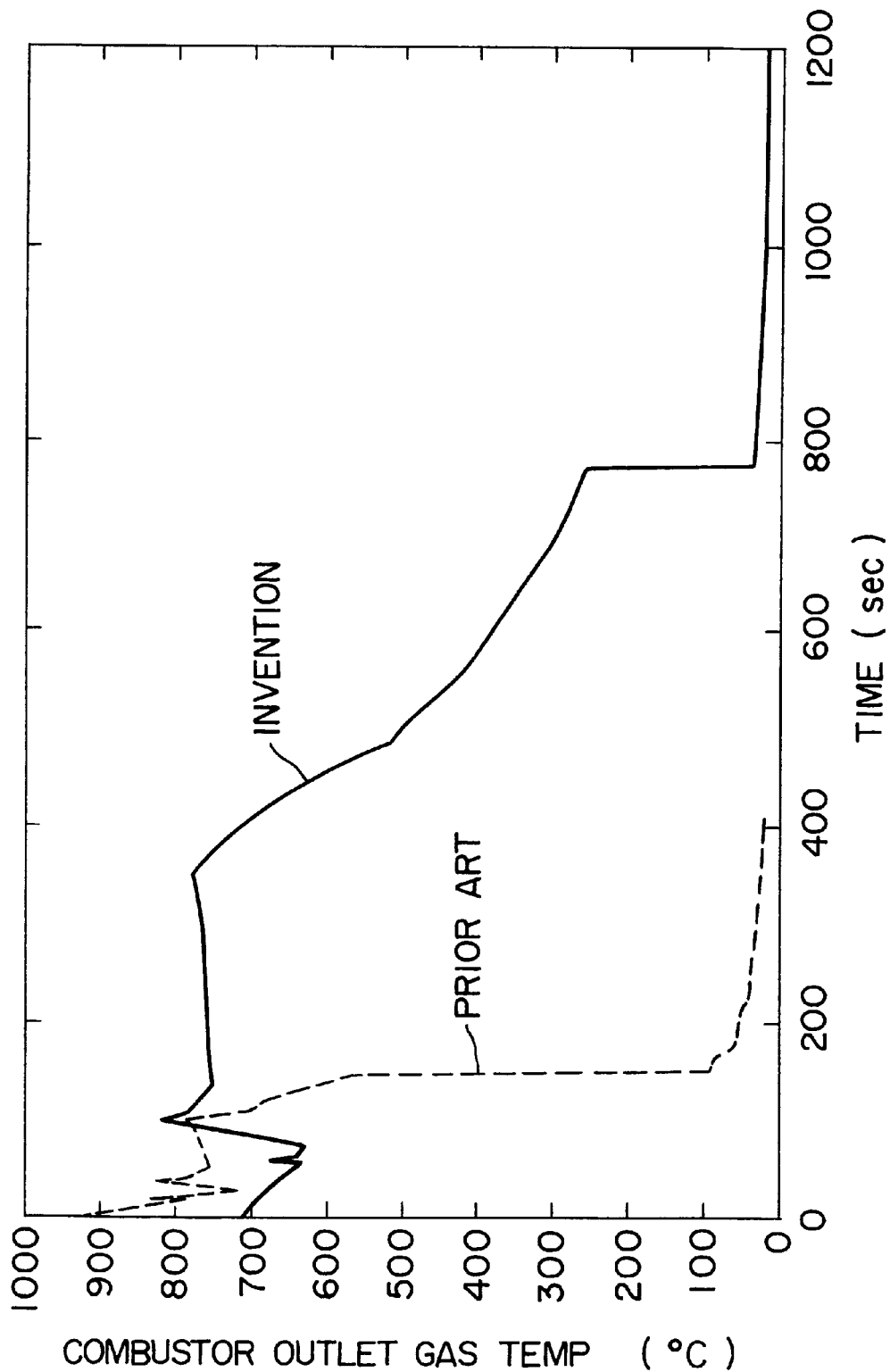
FIG. 6 is a graphical representation showing the relationship between the outlet gas temperature of the combustor and the time from the disconnection of the turbine shaft from the external power system to the deignition of the gas turbine, in which a solid line indicates that of the invention and a dashed line indicates that of the prior art.

Here, it seems that the time from the disconnection of the electric power generator to the deignition of the gas turbine exerts a large influence upon the metal fatigue. In more detail, in the case of the gas turbine of the 150 MW to 250 MW power class, although the time required from the disconnection to the deignition is about 5 to 10 min, when this time is extended to a value from ten and several min to 25 min, it is possible to reduce the metal fatigue markedly. The metal is shrunk violently when the temperature drops from 700° C. to 800° C. (at disconnection) to 100° C. to 200° C. (at deignition). As a result, a large tensile stress is generated in the high temperature parts of the gas turbine. However, when the time required for this change process is lengthened, it is possible to reduce the metal fatigue effectively. In FIG. 6, a solid line indicates the outlet gas temperature of the combustor in the control method according to the present invention, and a dashed line indicates the outlet gas temperature of the combustor in the prior art control method.

In the case of the prior art control method, when the revolution speed of the gas turbine is reduced, since the shaft torque is also reduced markedly, it has been impossible to maintain the revolution speed at a small speed reduction rate in the low revolution speed range. In contrast with this, in the case of the control method according to the present invention, since the torque can be generated by the static type starting equipment 6 in the stop process, it is possible to stabilize the revolution speed of the gas turbine and further to reduce the revolution speed thereof gradually. As a result, the time from the disconnection to the deignition can be lengthened, so that it is possible to reduce the metal fatigue effectively.

In practice, the stop process is executed as follows: During the stop process, the static type starting equipment 6 is driven at a time near the disconnection time. In the case of the gas turbine of 250 MW power class, for instance, the power generated on the turbine side of the gas turbine 1 is about 100 MW at the no-load rated revolution speed, so that the output balanced with this turbine output becomes a power required for the compressor 2. On the other hand, since the power generated by the static type starting equipment 6 is about 3 MW to 10 MW (i.e., only 3% to 10% of the power required for the compressor 3), there exists no large change of the revolution speed of the gas turbine between before and after the disconnection.

Therefore, in the control method according to the present invention, the static type starting equipment 6 controls the revolution speed of the gas turbine in accordance with a program previously prescribed in accordance with the first function 7. In more detail, as shown in FIG. 1, a programmed revolution speed of the turbine shaft with respect to time elapsed after the disconnection of the electric power generator 3 is set to the first function 7 stored in the function setting device. Further, a difference signal (a–b) between the programmed revolution speed outputted from the function setting device for storing the first function 7 and the actual revolution speed detected by the speed detector 8 is calculated by the comparator 9. The calculated differential signal is applied to the static type starting equipment 6 to adjust the output of the static type starting equipment 6.

On the other hand, the flow rate of the fuel supplied to the gas turbine is controlled as follows: the amount of fuel according to the actual revolution speed detected by the speed detector 8 is obtained in accordance with the second function 10 previously set to the function setting device. Further, a flow rate command signal determined in accordance with the second function 10 is applied to the fuel control valve 11 in such a way that the fuel of this obtained fuel amount can be supplied to the combustor 4. Further, the amount of fuel actually supplied to the combustor 4 is controlled on the basis of this flow rate command signal.

Here, in the function setting devices for setting the first and second functions 7 and 10, respectively, the set values are adjusted in such a way that the thermal stress at the high temperature parts of the gas turbine can be reduced in the stop process of the gas turbine shaft. Therefore, it is possible to increase the life time of the high temperature parts of the gas turbine. In practice, it is possible to reduce the cracks generated in the static vanes of the gas turbine and the combustor markedly.

Further, since the first and second functions 7 and 10 are set to two different function setting devices, respectively, even after the gas turbine has been installed, it is possible to change the set values easily under due consideration of the influence upon the high temperature parts of the gas turbine in the stop operation of the turbine shaft, on the basis of the gas turbine data obtained in the trial operation or in the periodical inspection.

Here, the case where the gas turbine load is cut off will be described hereinbelow.

In the case where a load is cut off as when the electric power generator 3 is disconnected from an external power system, although the output of the gas turbine 1 is in the state where the load is about to be cut off, since the load of the electric power generator 3 is disconnected from the external power system, the power generator 3 decreases its electric energy to that required to maintain a predetermined load. Therefore, the revolution speed of the turbine shaft increases rapidly. In general, the revolution speed of the turbine shaft is controlled so as not to reach an excessive trip revolution speed by reducing the amount of fuel supplied to the gas turbine by use of the fuel adjusting valve 11 of the gas turbine on the basis of the load cut-off signal and by adjusting the opening rate of the inlet side guide vane 5. In the recent thermal power plant, however, since the fuel system is complicated due to an increase of electric capacity and due to environmental countermeasures, an excessive energy (not preferable from the standpoint of control) tends to increase, with the result that the margin of the revolution speed determined for the excessive trip revolution speed is reduced.

To overcome this problem, in the control method according to the present invention, the static type starting equipment 6 is connected to the electric power generator 3 as a resistance body on the basis of the load cut-off signal, so that it is possible to suppress an increase of the revolution speed of the turbine shaft by operating the static type starting equipment.

A second embodiment of the gas turbine electric power plant according to the present invention will be described hereinbelow with reference to FIG. 8.

Conventionally, the starting equipment has been used only in the starting process, without being used in the disconnection and stop process. In the present invention, however, the starting equipment is used even after the electric power generator has been disconnected from an external power system in the stop operation of the gas turbine. In addition, the revolution speed of the gas turbine is controlled by controlling the amount of fuel supplied to the combustor 4 in the same way as with the case of prior art.

Figure 8:
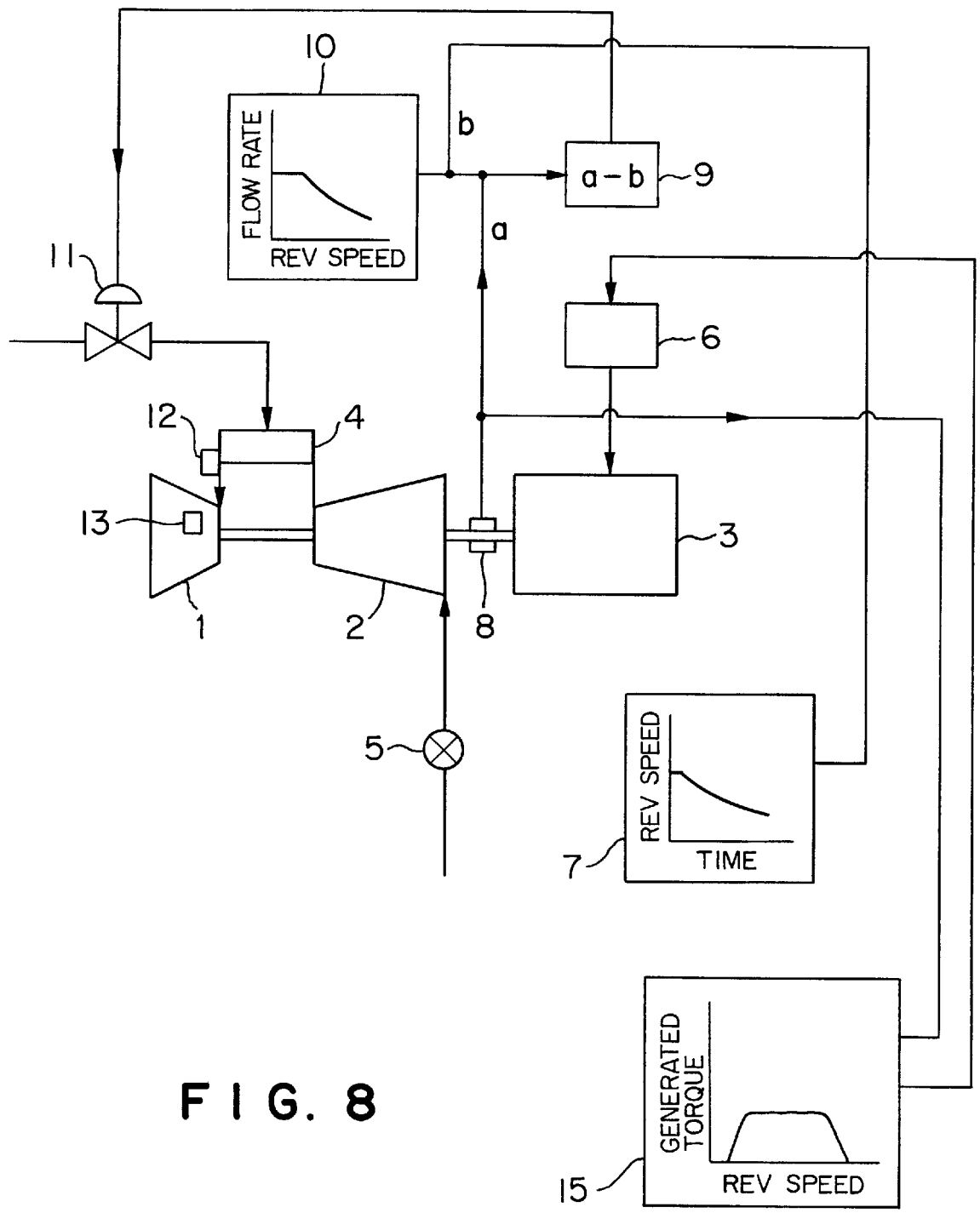
FIG. 8 is a schematic system diagram showing a second embodiment of the gas turbine electric power plant according to the present invention, which can be applied to the disconnection and the stop process of the turbine shaft.

In FIG. 8, three functions are set to the function setting devices, respectively. The first function 7 prescribes the relationship between the revolution speed of the turbine shaft and the time elapsed after a predetermined time; the second function 10 prescribes the relationship between the amount of fuel supplied to the combustor 4 and the revolution speed of the turbine shaft in the disconnection and stop process; and the third function 15 prescribes the relationship between the generated starting torque and the revolution of the turbine shaft started by the static type starting equipment 6.

In operation, the actual revolution speed of the turbine shaft is detected by the speed detector 8 at a time elapsed. Further, the amount of fuel supplied to the combustor 4 is controlled by the fuel control value 11 in such a way that the detected revolution speed becomes that determined at the time elapsed in accordance with the first and second functions 7 and 10.

On the other hand, in accordance with the third function 15, the torque generated by the static type starting equipment 6 is obtained in correspondence to the detected revolution speed of the turbine shaft. Further, the static type starting equipment 6 controls the electric power generator 3 in such a way that the power generator 3 can be operated as a motor for generating the torque thus obtained. In the above-mentioned embodiment, in the disconnection and stop process of the gas turbine (after the electric power generator has been disconnected from the external power system, the gas turbine is stopped), it is possible to prevent the revolution speed of the turbine shaft from being out of control. Therefore, since the change rate with respect to time and the change width of the gas turbine inlet side temperature can be controlled within the allowable range, it is possible to reduce the change width and the change rate of temperature of the high temperature parts of the gas turbine, thus realizing a long life of the high temperature parts.

The construction and the function of the static type starting equipment 6 will be described hereinbelow.

For brevity of the explanation, a static type starting equipment 6 having an output of about ½ required to start the turbine shaft is referred to as a 50% SFC (static frequency converter), and a static type starting equipment 6 having an output required to start the turbine shaft is referred to as a 100% SFC (static frequency converter).

Figure 9:
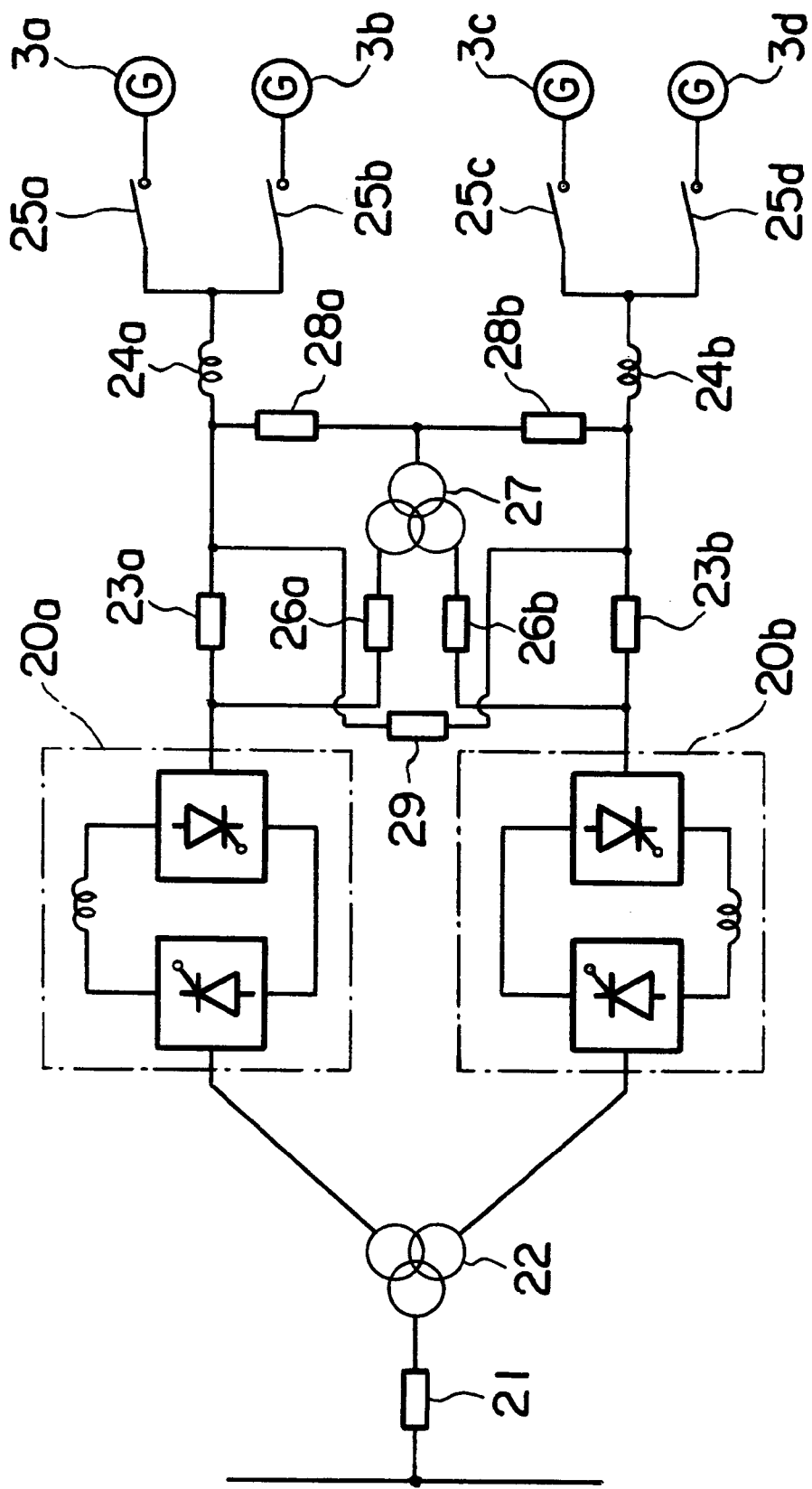
FIG. 9 is a block diagram showing an example of the static type starting equipment used for the thermal electric power plant provided with four-axis gas turbine according to the present invention.

FIG. 9 shows an example where the torque required to stop the turbine shaft in the shaft stop process corresponds to a single 50% SFC, in the thermal electric power plant having a four-shaft gas turbine. In other words, in this example, any given shaft can be started by combining two 50% SFCs 20a and 20b, and further two shafts can be stopped at the same time by use of a single 50% SFC 20a or 20b.

The above-mentioned two 50% SFCs 20a and 20b are connected to a power source of commercial frequency via a circuit breaker 21 and an input transformer 22, respectively. Each of the outputs of the two 50% SFCs 20a and 20b is branched. That is, one of the branched outputs of the 50% SFC 20a is connected to a short circuit current reducing ac reactor 24a via a breaker or disconnecting switch 23a, and further to two electric power generators 3a and 3b via two disconnecting switches 25a and 25b, respectively. Further, one of the branched outputs of the 50% SFC 20b is connected to a short circuit current reducing ac reactor 24b via a breaker or disconnecting switch 23b, and further to two electric power generators 3c and 3d via two disconnecting switches 25c and 25d, respectively. Further, the other of the branched outputs of the 50% SFC 20a is connected to an output transformer 27 via a disconnecting switch 26a. Further, the other of the branched outputs of the 50% SFC 20b is also connected to the same output transformer 27 via a disconnecting switch 26b. The output of this transformer 27 is connected to the reactor 24a via a disconnecting switch 28a and then to the two electric power generators 3a and 3b via the two disconnecting switches 25a and 25b, respectively. In the same way, the output of this transformer 27 is connected to the reactor 24b via a disconnecting switch 28b and then to the two electric power generators 3c and 3d via the two disconnecting switches 25c and 25d, respectively.

Therefore, it is possible to supply 100% revolution power required to start the shaft by doubling the voltages of the two 50% SFCs 20a and 20b via the output transformer 27. Further, since the disconnecting switches 26a and 26b are connected as described above, it is possible to freely select any of the second and after shafts required to be started by opening or closing the four disconnecting switches 25a, 25b, 25c and 25d immediately after one shaft has been started.

Successively, in the stop process, the disconnecting switches 26a and 26b and the disconnecting switch 29 are all opened, and further the breaker 21 is turned on to supply the commercial power source to the 50% SFC 20a via the input transformer 22. The 50% SFC 20a converts the frequency of the predetermined power source, to drive the two electric power generators 3a and 3b via the disconnecting switches 23a, the reactor 24a, and the two disconnecting switches 25a and 25b, as two synchronous motors, respectively. Therefore, the revolution speeds of the two turbine shafts can be increased for revolution speed control. Further, in the same way as above, the 50% SFC 20b converts the frequency of the predetermined power source, to drive the two electric power generators 3c and 3d via the disconnecting switches 23b, the reactor 24b and the two disconnecting switches 25c and 25d, as two synchronous motors, respectively. Further, the disconnecting switch 29 is a backup circuit used when one of the 50% SFC 20a and 20b cannot be used due to trouble.

Therefore, when the two static type starting equipments of ½ capacity are provided for a two-shaft gas turbine, for instance, the starting can be made by combining the two ½-capacity static type starting equipments in the starting process. On the other hand, in the stop process, it is possible to use the two ½-capacity static type starting equipments separately for the two-shaft gas turbine. In this case, the two shafts can be stopped at the same time. In the ordinary plant starting, since the gas turbine is started on the basis of a power demand schedule one to three hours before the rated output is required to be generated, it is unnecessary to start a plurality of the gas turbines at the same time. In other words, in general, each turbine shaft is stated at intervals of about 5 to 30 min. On the other hand, when the gas turbines must be stopped due to some trouble, a plurality of the gas turbines must be stopped at the same time. In the control method according to the present invention, the above-mentioned construction can satisfy these requirements appropriately. As described above, in the control method according to the present invention, it is possible to stop and start the gas turbines stably and economically, without deteriorating or damaging the start and stop operation.

Figure 10:
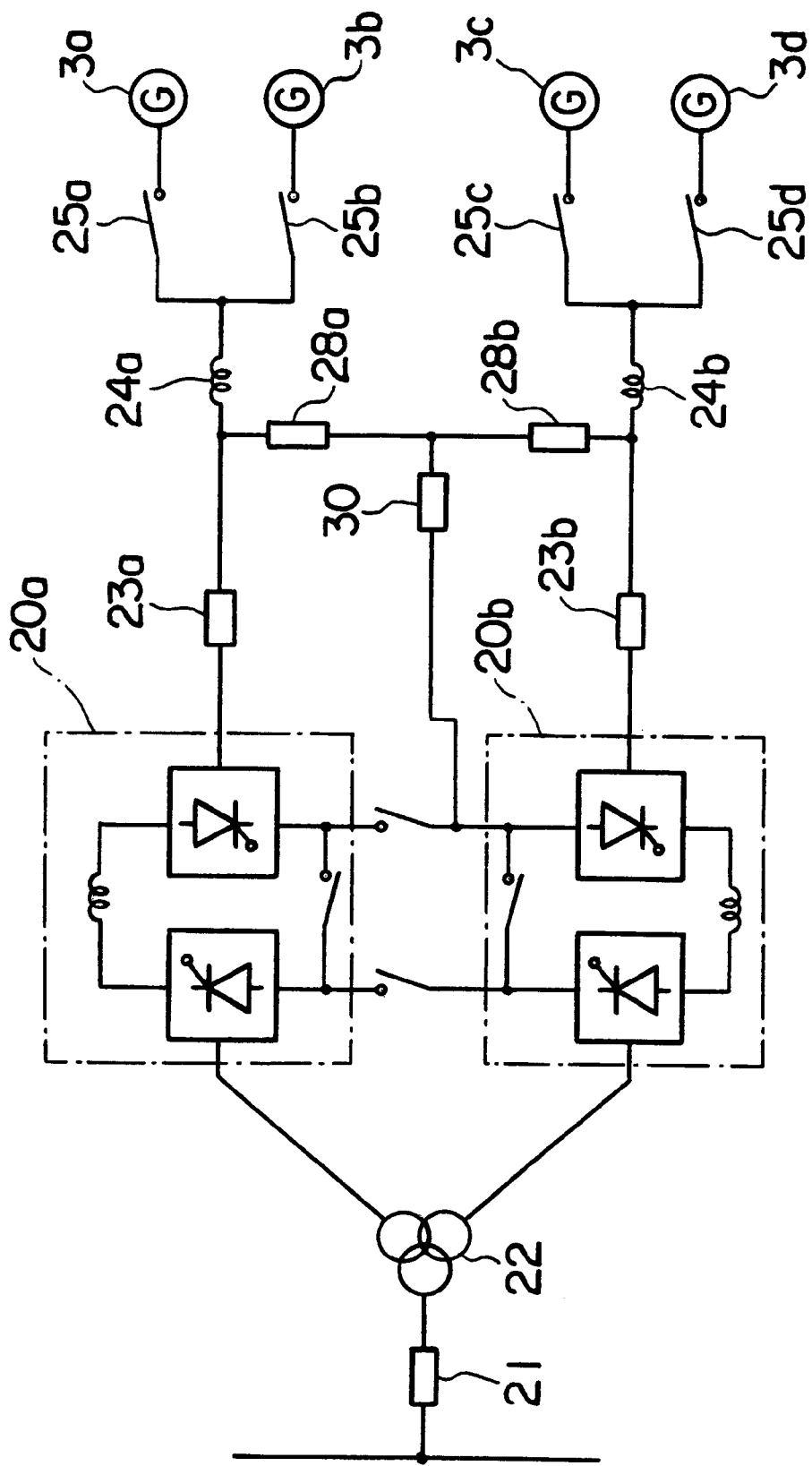
FIG. 10 is a block diagram showing a modification of the static type starting equipment used for the thermal electric power plant shown in FIG. 9.
Figure 12:
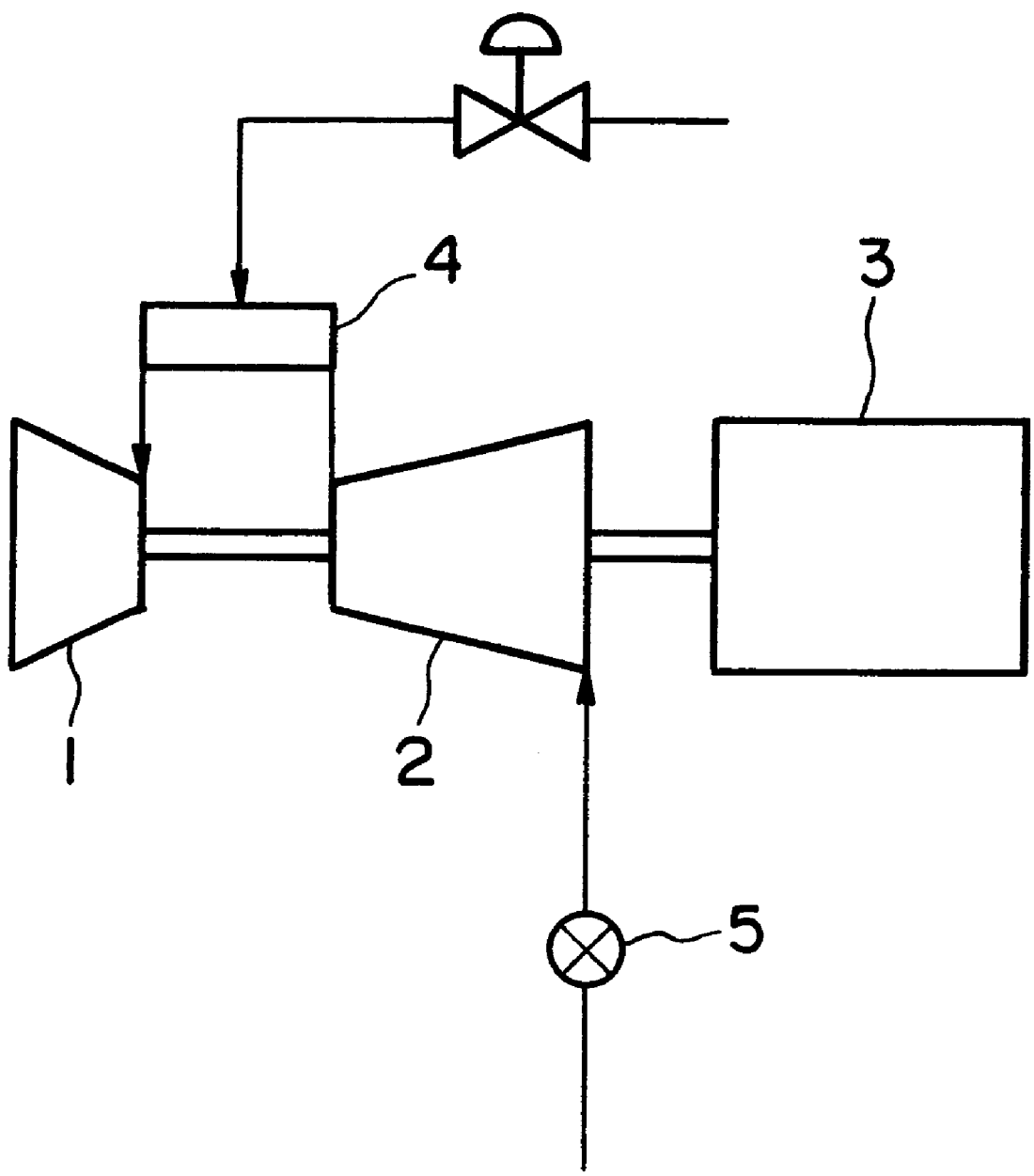
FIG. 12 is a schematic system diagram showing the prior art gas turbine electric power plant.

FIG. 10 shows a construction of an example of the static type starting equipment, in which six-phase rectifying circuits are connected in cascade and further the output thereof can be switched from 50% output to 100% output or vice versa.

In FIG. 10, a commercial power source is connected to a three-winding input transformer 22 via a breaker 21. Further, two secondary windings of the input transformer 22 are connected to the six-phase converters 20a and 20b, respectively. When only the output of the 50% SFC is necessary on the generator side (as when the turbine shaft is stopped), the two converters 20a and 20b are disconnected from each other. Further, when two disconnecting switches 23a and 23b are closed and two disconnecting switches 28a and 28b are opened, it is possible to supply the variable power source to an electric power generator 3a or 3b and 3c or 3c selected by a disconnecting switch 25a or 25b and 25c or 25d via an ac reactor 24a or 24b, to start the gas turbine shaft, respectively.

Further, in the shaft starting process, when the two converters 20a and 20b are connected to each other and further when the two disconnecting switches 23a and 23b are opened and a disconnecting switch 30 is closed, it is possible to supply 100% output of the two converters 20a and 20b to the electric power generator (e.g., 3a) required to be activated as a synchronous motor for driving the started turbine shaft, by closing the disconnecting switches (e.g., 28a and 25a).

FIG. 11 is a three-wire connection diagram showing the cascade connected six-phase rectifier circuits 20a and 20b shown in FIG. 10. The switching operation thereof will be described in further detail hereinbelow.

In FIG. 11, a bridge is formed by use of six-sets of rectifier elements 31, and each bridge has each output terminal. The two-sets of the bridges are connected in cascade. Two disconnecting switches 32 and six disconnecting switches 33 are provided on the dc side, and 100% output terminals are provided between the two disconnecting switches 32 and the six disconnecting switches 33 in such a way that 50% and 100% can be switched each other.

When the turbine shaft is stopped; that is, when only the 50% SFC output is required, the two disconnecting switches 32 are closed and the six disconnecting switches 33 are set to an A side, respectively. Under these conditions, the six-phase rectifiers can be used separately. When the turbine shaft is started; that is, when the 100% SFC output is required, the two disconnecting switches 32 are opened and the six disconnecting switches 33 are set to a B side, respectively to connect the two six-phase rectifiers in cascade. Under these conditions, since the input side converters and the output side inverters can be connected in the same way, it is possible to double the capacity of the starting equipment.

Further, in FIG. 9, when only the 50% SFC 20a is connected to the output transformer 27 to increase the generator output, as compared when the output transformer is not used, the current flowing into the generator can be reduced, so that it is possible to operate the generator so as to reduce the induced current containing higher harmonic components (applied to the rotor side).

Further, in the shaft stop process, when a torque larger than a value of ½ of that required when the turbine shaft is started, it is possible to supply a required torque at the shaft stop process by constructing the circuit in the same way as with the case of the shaft start process.

As described above, in the embodiments according to the present invention, since the static type starting equipment 6 is adopted to give a variable frequency power source to the electric power generator in such a way that the electric power generator can generate a torque as a motor, and further since the revolution speed control of the turbine shaft in the start process is shifted from the gas turbine fuel control to the static starting equipment control, it is possible to improve the response speed in both the acceleration control and the speed control of the turbine shaft; that is, to realize a high precise revolution speed control of the gas turbine in start operation and further to suppress an increase and an increase rate of the output temperature of the combustor of the gas turbine. As a result, it is possible to reduce the temperature change range and the temperature change rate of the high temperature parts of the gas turbine, so that the life time of the high temperature parts can be lengthened.

Further, since the revolution speed of the gas turbine shaft can be controlled by the static type starting equipment and further since the amount of fuel to be supplied is controlled in accordance with a program, it is possible to change the outlet gas temperature of the combustor roughly linearly, and further to reduce the change rate thereof. Therefore, the fuel gas temperature can be reduced gradually, without deigniting the gas turbine until the revolution speed of the turbine shaft is reduced sufficiently. Further, since the amount of air supplied after deignition can be reduced appropriately to prevent the high temperature parts from being cooled rapidly, the thermal stress of the high temperature parts can be reduced, so that the life time thereof can be increased.

Further, since the static type starting equipment is used as a resistance body of the turbine shaft system, it is possible to suppress an increase of the revolution speed of the turbine shaft, so that the revolution speed control can be facilitated, as compared with when the over-speed is prevented by use of only the fuel control system of the gas turbine.

Further, when a plurality of the static type starting equipments are used together in combination with the output transformer, it is possible to start the turbine shafts by use of a plurality of the starting equipments and to stop the same shaft by use of only a single static type starting equipment, so that an economical equipment can be realized.

Further, in the control method according to the present invention, although the static type starting equipment 6 has been used as the starting equipment, it is possible to use a combination of a motor and a torque converter or an ordinary motor driven electrically.

As described above, in the control method according to the present invention, since the revolution speed of the turbine shaft can be controlled by use of a starting equipment, it is possible to improve the response speed of the revolution speed control, as compared with when only the amount of fuel to be supplied to the combustor is controlled, so that the revolution speed of the gas turbine can be controlled accurately at high response speed.

As a result, in both the starting and stopping process of the gas turbine, the change width and the change rate with respect time of the gas turbine inlet side temperature can be reduced within an allowable range, so that the temperature change width and the temperature change rate of the high temperature parts of the gas turbine can be both reduced, to realize a long life time of the high temperature parts of the gas turbine.

What is claimed is:

1. A method of controlling a gas turbine electric power plant, comprising the steps of:
    prescribing a relationship between a time elapsed after a predetermined reference time in a predetermined process for starting or stopping the gas turbine electric power plant and a revolution speed of a turbine shaft in accordance with a first function;
    prescribing a relationship between a revolution speed of the turbine shaft in the predetermined process and a flow rate of fuel to be supplied to a combustor in accordance with a second function;
    measuring an actual revolution speed of the turbine shaft at the time elapsed;
    supplying to the combustor a flow rate of fuel corresponding to the actual revolution speed in accordance with the second function; and
    rotating the turbine shaft by a starting equipment for driving the turbine shaft in such a way that the measured actual revolution speed becomes the revolution speed corresponding to the time elapsed prescribed in accordance with the first function.

2. The method of controlling a gas turbine electric power plant of claim 1, wherein the starting equipment is a static type starting equipment for using an electric power generator, directly connected to the gas turbine, as a motor.

3. The method of controlling a gas turbine electric power plant of claim 1, wherein the starting equipment is a driving motor.

4. The method of controlling a gas turbine electric power plant of claim 1, wherein the predetermined process is a starting process such that the revolution speed of the turbine shaft reaches a rated revolution speed after the gas turbine has been ignited.

5. The method of controlling a gas turbine electric power plant of claim 4, wherein the predetermined reference time is an ignition time of the gas turbine.

6. The method of controlling a gas turbine electric power plant of claim 1, wherein the predetermined process is a disconnection and stop process of the turbine shaft, executed after an electric power generator has been disconnected from an external power system in stop operation of the gas turbine.

7. The method of controlling a gas turbine electric power plant of claim 6, wherein the predetermined reference time is a disconnection time of the electric power generator from the external power system.

8. The method of controlling a gas turbine electric power plant of claim 1, wherein:
    the second function prescribes the relationship between the revolution speed of the turbine shaft and the flow rate of fuel supplied to the combustor in such a way that a change range of the gas turbine inlet temperature or a change rate with respect to time of the gas turbine inlet temperature lies within an allowable range; and
    the first function prescribes the relationship between the time elapsed and the revolution speed of the turbine shaft in such a way that a gas turbine outlet temperature is controlled to be a predetermined temperature, by supplying an amount of air, required to burn fuel corresponding to the obtained flow rate, to the combustor.

9. The method of controlling a gas turbine electric power plant of claim 1, wherein the starting equipment drives the turbine shaft in such a way that a difference between the measured actual revolution speed and the revolution speed of the turbine shaft corresponding to the time elapsed prescribed in accordance with the first function is zeroed.

10. A control equipment for controlling a gas turbine electric power plant, in which a gas turbine, an electric power generator and a compressor are coupled to each other via a single shaft, the control equipment comprising:
    a data section for prescribing a relationship between a time elapsed after a predetermined reference time in a predetermined process for starting or stopping the gas turbine electric power plant and a revolution speed of a turbine shaft in accordance with a first function and for further prescribing a relationship between a revolution speed of the turbine shaft in the predetermined process and a flow rate of fuel to be supplied to a combustor in accordance with a second function;

revolution speed measuring means for measuring an actual revolution speed of the turbine shaft at the time elapsed;

a starting equipment for driving the turbine shaft in such a way that the revolution speed of the turbine shaft becomes a revolution speed corresponding to the time elapsed prescribed in accordance with the first function; and fuel supplying means for supplying a fuel flow rate corresponding to the actual revolution speed of the turbine shaft, in accordance with the second function, to the combustor.

11. The control equipment for controlling a gas turbine electric power plant of claim 10, wherein the starting equipment is a static type starting equipment for using the electric power generator directly connected to the gas turbine, as a motor.

12. The control equipment for controlling a gas turbine electric power plant of claim 10, wherein the static type starting equipment controls the revolution speed of the turbine shaft, by supplying variable frequency current to the electric power generator so as to generate a torque as a motor.

13. The control equipment for controlling a gas turbine electric power plant of claim 10, wherein the starting equipment is a driving motor.

14. The control equipment for controlling a gas turbine electric power plant of claims 10, wherein:

the gas turbine electric power plant includes a plurality of turbine shafts each obtained by coupling a gas turbine, an electric power generator and a compressor via a single shaft; and a static type starting equipment of the same capacity as the electric power generator directly connected to the gas turbine, is provided for each shaft of the plural turbine shafts;

wherein at least two sets of the static type starting equipment of the same capacity and provided for each shaft, can be connected to a single shaft in combination.

15. The control equipment for controlling a gas turbine electric power plant of claim 10, wherein:

the gas turbine electric power plant is constructed by a plurality of turbine shafts each obtained by coupling a gas turbine, an electric power generator and a compressor via a single shaft;

a static type starting equipment of the same capacity used as the electric power generator directly connected to the gas turbine is provided for each shaft of the plural turbine shafts; and at least two static type starting equipments of the same capacity and provided for each shaft are connected in cascade via disconnecting switches.

* * * * *